United States Patent Office 3,137,721
Patented June 16, 1964

3,137,721
TRIS-(1,2-DICHLORO-1-CYCLOHEXEN-4-YL)-PHOSPHITE
Ralph B. Thompson, Hinsdale, Ill., assignor to Universal Oil Products Company, Des Plaines, Ill., a corporation of Delaware
No Drawing. Filed June 5, 1961, Ser. No. 114,604
1 Claim. (Cl. 260—461)

This invention relates to novel compositions of matter which possess insecticidal properties and to a method for the preparation thereof. More specifically the invention is concerned with halocycloalkenic derivatives of substituted phosphorus compounds and to a method for preparing the same.

The use of compositions of matter which possess active insecticidal or pesticidal properties has increased at a very rapid rate during the past several years. This increase in use of new products is due in part to the fact that some insects appear to have developed a resistance to certain types of insecticides thereby rendering said insecticides impotent in controlling the growth and spread of the aforesaid insects. New and different insecticidal compositions of matter must therefore be prepared and must exhibit new and effective insecticidal properties. Therefore in view of this increased use, compositions of matter which possess the necessary toxic properties towards pests and insects, and which are economical to manufacture, would be commercially attractive articles of commerce.

It is therefore an object of this invention to prepare compositions of matter possessing insecticidal activity.

A further object of this invention is to prepare insecticidal compositions of matter comprising halocycloalkenic derivatives of substituted phosphorus compounds.

One embodiment of this invention resides in a process for the preparation of a halocycloalkenic derivative of a substituted phosphorus compound which comprises condensing, at condensation conditions, a halogenated unsaturated compound selected from the group consisting of halogenated alkadienes and halogenated cycloalkadienes with a substituted phosphorus compound selected from the group consisting of substituted phosphates and substituted phosphites in which at least one substituent contains an ethylenic double bond, and recovering the desired condensation products.

Another embodiment of this invention resides in a halocycloalkenic derivative of a substituted phosphorus compound.

A further embodiment of this invention is found in a process for the preparation of a halocycloalkenic derivative of a substituted phosphorus compound which comprises condensing, at a temperature in the range of from about 25° to about 300° C. and at a pressure in the range of from about 1 to about 100 atmospheres, a halogenated cycloalkadiene with a substituted phosphate in which at least one substituent contains an ethylenic double bond, and recovering the desired halocycloalkenic derivative of the substituted phosphate.

A specific embodiment of this invention resides in a process for the preparation of a halocycloalkenic derivative of a substituted phosphorus compound which comprises condensing, at a temperature in the range of from about 25° to about 300° C. and at a pressure in the range of from about 1 to about 100 atmospheres, hexachlorocyclopentadiene with triallyl phosphate, and recovering the desired tris-(1,2,3,4,7,7-hexachloro-2-norbornen-5-ylmethyl)-phosphate.

Another specific embodiment of this invention is tris-(1,2,3,4,7,7-hexachloro-2-norbornen-5-yl)phosphite.

Other objects and embodiments referring to alternative halogenated alkadienes, halogenated cycloalkadienes and substituted phosphorus compounds of the type hereinafter set forth will be found in the following further detailed description of the invention.

It has now been discovered that a substituted phosphorus compound such as a phosphate or a phosphite in which at least one of the substituents is unsaturated and, more specifically, contains an ethylenic double bond may be condensed with a halogenated unsaturated compound such as alkadienes and cycloalkadienes in which the double bonds are in a conjugated Diels-Alder type reaction to form halocycloalkenic derivatives of the substituted phosphorus compounds. The compounds thus formed by the process of this invention will find a wide variety of uses in the chemical field, especially as insecticides. For example, the condensation product which results from the Diels-Alder reaction between hexachlorocyclopentadiene and triallyl phosphate, namely, tris-(1,2,3,4,7,7-hexachloro-2,5-norbornen-5-ylmethyl)phosphate will be active as an insecticide, especially against houseflies. In addition, the reaction products of this invention may also be used as intermediates in the preparation of resins, pharmaceuticals, plastics, etc. For purposes of this invention the term "halocycloalkene" and "halocycloalkenic" as used hereinafter in the specification and appended claims will refer to halocycloalkenes, polyhalocycloalkenes, halobicycloalkenes and polyhalobicycloalkenes.

The process of this invention in which the halo-substituted diolefin, either straight chain or cyclic, and preferably conjugated in nature, is condensed with the substituted phosphorus compound in which at least one substituent contains an ethylenic linkage is effected in a Diels-Alder manner at temperatures in the range of from about ambient (25° C.) to about 300° C. or more, and often preferably in a range of from about 100° to about 250° C., the temperature depending upon the reactants which undergo condensation. Generally speaking, the reaction will take place at atmospheric pressure, however, if higher temperatures than the boiling point of the reactants are to be employed, superatmospheric pressures ranging from about 2 to about 100 atmospheres or more will be used in the reaction, the amount of pressure used being necessary to maintain at least a portion of the reactants in the liquid phase.

The reactants are present in the reaction mixture in a mole ratio in the range of from about 1:1 to about 3:1 moles of halogenated alkadiene or halogenated cycloalkadiene per mole of substituted phosphorus compound, the mole ratio being dependent on the number of unsaturated substituents on the phosphorus compound.

In addition, if so desired, the reaction will take place in the presence of inert organic solvents including aromatic solvents such as benzene, toluene, o-, m- and p-xylene, ethylbenzene, etc.; alcohols such as methyl alcohol, ethyl alcohol, propyl alcohol, etc.; ethers such as dimethyl ether, diethyl ether, dipropyl ether, etc.; paraffinic hydrocarbons both straight chain and cyclic such as pentane, hexane, heptane, cyclopentane, methylcyclopentane, cyclohexane, etc.; or other organic solvents such as acetone, acetic acid, etc.

Unsaturated halogenated compounds containing only carbon, hydrogen and halogen atoms which may be reacted with the substituted phosphorus compound in the process of the present invention include straight chain halogenated diolefins having the general formula:

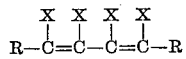

in which each of the X radicals is independently selected from the group consisting of hydrogen and halogen radicals having an atomic weight of from 35 to 127 (i.e. chlorine, bromine or iodine) at least one X being halogen, and each of the R radicals is independently selected from the group consisting of hydrogen and alkyl radicals containing from 1 to 6 carbon atoms, or polyhalocycloalkadienes containing only carbon, hydrogen and halogen atoms having the general formula:

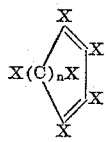

in which X has the same meaning as above. Examples of these compounds include haloalkadienes such as 1-chloro-1,3-butadiene,
1,3-dichloro-1,3-butadiene,
1-bromo-1,3-butadiene,
1,3-dibromo-1,3-butadiene,
1,3-diiodo-1,3-butadiene,
2,3-dichloro-1,3-butadiene,
2,3-dibromo-1,3-butadiene,
2,3-diiodo-1,3-butadiene,
1,2,3-trichloro-1,3-butadiene,
1,2,3-tribromo-1,3-butadiene,
1-iodo-1,3-butadiene,
1,2-diiodo-1,3-butadiene,
1,2,3-triiodo-1,3-butadiene,
1,2,3,4-tetrachloro-1,3-butadiene,
1,2,3,4-tetrabromo-1,3-butadiene,
1,2,3,4-tetraiodo-1,3-butadiene,
1,3-dichloro-2-methyl-1,3-butadiene,
2-chloromethyl-1,3-butadiene,
1,4-dichloro-2-methyl-1,3-butadiene,
1,4-dichloro-2-chloromethyl-1,3-butadiene,
1,4-dichloro-2-dichloromethyl-1,3-butadiene,
1,3-dibromo-2-methyl-1,3-butadiene,
1,4-dibromo-2-methyl-1,3-butadiene,
1,4-dibromo-2-bromomethyl-1,3-butadiene,
1,4-dibromo-2-dibromomethyl-1,3-butadiene,
1,3-diiodo-2-methyl-1,3-butadiene,
1,4-diiodo-2-methyl-1,3-butadiene,
1,4-diiodo-2-iodomethyl-1,3-butadiene,
1,4-diiodo-2-diiodomethyl-1,3-butadiene, etc.;

and halocycloalkadienes, such as halogenated 1,3-cyclopentadienes which for purposes of this invention will be designated as halogenated cyclopentadienes including 1-, 2-, or 5-chlorocyclopentadiene,
1,5-, 5,5-, 2,3-, 1,4-, 1,2-, or 1,3-dichlorocyclopentadiene,
1,5,5-, 1,2,5-, 1,3,5-, 1,2,4-, 2,5,5-, 1,4,5-, or 1,2,3-trichlorocyclopentadiene,
2,3,5,5-, 1,2,3,5-, 1,2,4,5-, 1,2,3,4-, 1,3,5,5-, 1,2,5,5-, or 1,4,5,5-tetrachlorocyclopentadiene,
1,2,3,5,5-, 1,2,4,5- or 1,2,3,4,5-pentachlorocyclopentadiene, hexachlorocyclopentadiene, the corresponding monobromocyclopentadienes, polybromocyclopentadienes, monoiodocyclopentadienes,
polyiodocyclopentadienes, etc.;
1,2-dichloro-1,3-cyclohexadiene,
1,2,3-trichloro-1,3-cyclohexadiene,
octachloro-1,3-cyclohexadiene, etc.,
1,2-dibromo-1,3-cyclohexadiene,
1,2,3-tribromo-1,3-cyclohexadiene,
octabromo-1,3-cyclohexadiene,
1,2-diiodo-1,3-cyclohexadiene,
1,2,3-triiodo-1,3-cyclohexadiene,
octaiodo-1,3-cyclohexadiene, etc.

In addition, it is also contemplated that polyhaloalkadienes and polyhalocycloalkadienes which are used in this process may contain more than one species of halo substituents, such as, for example, 1,2-dichloro-3-bromo-1,3-butadiene,
1-chloro-3-bromo-1,3-butadiene,
1-iodo-3-chloro-1,3-butadiene,
2-bromo-3-chloro-1,3-butadiene,
1,3-dichloro-2-bromomethyl-1,3-butadiene,
1,3-dichloro-2-iodomethyl-1,3-butadiene,
1-chloro-2-bromocyclopentadiene,
1,2-dichloro-3-bromocyclopentadiene,
1,2-dichloro-5,5-dibromocyclopentadiene, etc., may also be used although not necessarily with equivalent results.

Substituted phosphorus compounds containing only carbon, hydrogen, phosphorus and oxygen atoms and in which at least one substituent has an ethylenic double bond which are reacted with the aforementioned halogenated unsaturated compounds are selected from the group having the generic formulas:

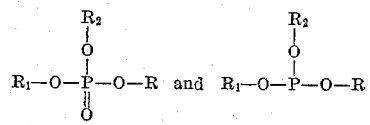

in which the R, $R_1$ and $R_2$ radicals are selected from the group consisting of alkyl, aryl, cycloalkyl, aralkyl, alkaryl and $-C_m-(C=C)-R_3$ radicals in which $m$ is an integer of from 0 to 6 and $R_3$ is hydrogen or an alkyl radical, at least one of the R, $R_1$ or $R_2$ radicals being the last named unsaturated radical. Examples of these compounds include vinyl phosphate, divinyl phosphate, trivinyl phosphate, allyl phosphate, diallyl phosphate, triallyl phosphate, methallyl phosphate, dimethallyl phosphate, trimethallyl phosphate, crotonyl phosphate, dicrotonyl phosphate, tricrotonyl phosphate, pentenyl phosphate, dipentenyl phosphate, tripentenyl phosphate, vinyl phosphite, divinyl phosphite, trivinyl phosphite, allyl phosphite, diallyl phosphite, triallyl phosphite, methallyl phosphite, dimethallyl phosphite, trimethallyl phosphite, crotonyl phosphite, dicrotonyl phosphite, tricrotonyl phosphite, pentenyl phosphite, dipentenyl phosphite, tripenenyl phosphite, etc., vinylmethylphosphate, allylmethylphosphate, methallylmethylphosphate, vinylmethylphosphite, allylmethylphosphite, methallylmethylphosphite, bis-(methyl)vinyl phosphate, bis-(methyl)allyl phosphate, bis-(methyl)methallyl phosphate, bis-(methyl)vinyl phosphite, bis-(methyl)allyl phosphite, bis-(methyl)methallyl phosphite, bis(ethyl)vinyl phosphate, bis-(ethyl)allyl phosphate, bis-(ethyl)methallyl phosphate, bis-(ethyl)vinyl phosphite, bis-(ethyl)allyl phosphite, bis-(ethyl)methallyl phosphite, phenylvinyl phosphate, phenylallyl phosphate, phenylmethallyl phosphate, phenylvinyl phosphite, phenylallyl phosphite, phenylmethallyl phosphite, diphenylvinyl phosphate, diallylphenyl phosphate, dimethallylphenyl phosphate, divinylphenyl phosphite, diallylphenyl phosphite, dimethallylphenyl phosphite, etc. It is to be understood that the aforementioned substituted phosphorus compounds in which at least one substituent contains an ethylenic linkage as well as the halo substituted alkadienes and halo substituted cycloalkadienes are only representatives of the class of compounds which may be used and that this invention is not necessarily limited thereto.

The physical properties of the present halocycloalkenic derivatives of a substituted phosphorus compound, and the effects they have on entomological forms of life make them particularly desirable as insecticides and insect repellants, the compounds having many of the features desired for materials of this purpose. They are, for example, toxic to insects which are destructive of plant life and materials normally subject to insect infestation, their toxic effects being manifested by contact of the poison with the insect. The insecticides comprising the compounds of the present invention are thus effective against chewing as well as sucking types of insects. In addition, the compounds are sufficiently volatile so that when applied to plant life intended for subsequent human consumption, the plants when harvested and after allowing a reasonable time for evaporation of the applied insecticides therefrom retain none of the toxicant to prevent use of the plant and consumption as food. On the other hand, the compounds are of sufficient limited volatility to be retained on the insect for the time required to accomplish the toxic effects of the compounds.

If so desired, the insecticide of the present invention may be combined with a diluent, said diluent being employed for the specific purpose of reducing the concentration of insecticides to the desired level in specific insecticide formulation. The particular formulation of active components in combination with the solvent or dispersant will depend upon its application. Compositions containing as high as 20% of active component may be preferred in some instances to allow deep penetration of the insecticides if so desired, as in the treatment of fibrous material, such as wood, for extinction of particular infestation, for example, wood termites. For other purposes, the required concentration of active components in the formulation may be low as 0.1% as, for example, in the treatment of fabrics for destroying moth larvae. In utilizing the present insecticidal compounds against most insects, a composition containing from about 0.1% to about 5% by weight of the active component is highly effective. The choice of the most desirable concentration depends upon the method utilized to apply the insecticidal composition to the infested article. In addition to the use of normal solvents, the insecticides may be dissolved in a suitable high boiling solvent or may be dispersed in a low molecular weight normally gaseous carrying agent such as propane, butane, the Freons, etc. The latter may be compressed and liquefied into a small bomb containing the insecticide which, upon release of pressure therefrom, vaporizes the liquid and suspends a quantity of the active component therein, thus providing a convenient spraying method of applying the insecticide.

The process of this invention may be effected in any suitable manner and may comprise either a batch or a continuous type operation. For example, when a batch type operation is used a quantity of the starting materials comprising a halo-substituted alkadiene or halo-substituted cycloalkadiene along with the substituted phosphorous compound of the type hereinbefore set forth and, if so desired, an inert organic solvent or diluent is placed in a condensation apparatus provided with heating and mixing means. The flask is then heated to the desired temperature and maintained thereat for a predetermined period of time, at the end of which time the flask and contents thereof are allowed to cool to room temperature. In the event that temperatures higher than the boiling points of the starting materials are to be used the aforesaid feed stocks are placed in the glass liner of a rotating autoclave along with the diluent and said liner is thereafter sealed into the autoclave. The desired pressure is effected and the apparatus is thereafter heated to the desired operating temperature. Upon completion of the predetermined residence time the autoclave and contents thereof are cooled to room temperature, the excess pressure is vented and the reaction product is separated and recovered by conventional means such as fractional distillation, crystallization, etc.

Another method of effecting the condensation reaction of the present invention is by a continuous type operation. In this type of operation the starting materials comprising the substituted phosphorus compound in which at least one substituent contains an ethylenic linkage and a halo-substituted alkadiene or halo-substituted cycloalkadiene are continuously charged to a reactor which is maintained at the proper operating conditions of temperature and pressure. The reactor may comprise an unpacked vessel or coil or may be lined with an adsorbent packing material such as fire brick, alumina, dehydrated bauxite and the like. If so desired, an inert organic diluent or solvent of the type hereinbefore set forth may be added through a separate line or may be admixed with one or the other of the starting materials prior to entry into said reactor and charged thereto in a single stream.

Examples of halocycloalkenic derivatives of substituted phosphorus compounds which may be prepared according to the process of this invention possess the generic formulas, for example, (1)
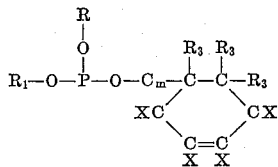

(1) when a monoalkenyl phosphate is reacted with a halo substituted alkadiene;

(2)
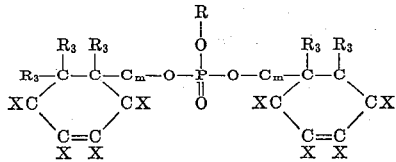

(2) when a dialkenyl phosphate is reacted with a halo substituted cycloalkadiene;

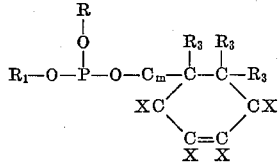

(3) when a monoalkenyl phosphite is reacted with a halo substituted alkadiene;

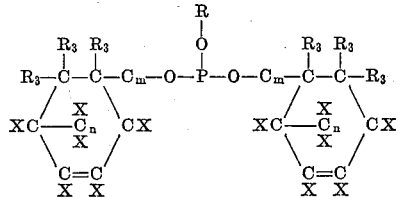

(4) when a dialkenyl phosphite is reacted with a halo substituted cylcoalkadiene. It is understood that the hereinbefore set forth formulas are only representative of the class of compounds which may be prepared and that other formulas depicting the condensation products formed as by the mono-, di- and trialkenyl phosphates with halo substituted cycloalkadienes as well as other formulas depicting the reaction between di- and trialkenyl phosphites with halo substituted alkadienes and mono- and trialkenyl phosphates with halo substituted cycloalkadienes will also illustrate these compounds. In each of the aforementioned formulas the various R's, $R_1$'s, $R_3$'s $m$'s, and $n$'s have the same meaning hereinbefore set forth. Specific examples of these compounds which may be prepared include 1,2-dichloro-1-cyclohexen-4-yl-phosphate,
1,2-dichloro-1-cyclohexen-4-yl-phosphite,
1,2-dichloro-1-cyclohexen-4-ylmethylphosphate,
1-cyclohexen-4-ylmethylphosphite,
bis-(1,2-dichloro-1-cyclohexen-4-yl)phosphate,
bis-(1,2-dichloro-1-cyclohexen-4-yl)phosphite,
bis-(1,2-dichloro-1-cyclohexen-4-ylmethyl)phosphate,
bis-(1,2-dichloro-1-cyclohexen-4-ylmethyl)-phosphite,
tris-(1,2-dichloro-1-cyclohexen-4-yl)phosphate,
tris-(1,2-dichloro-1-cyclohexen-4-yl)phosphite,
tris-(1,2-dichloro-1-cyclohexen-4-ylmethyl-phosphate,
tris-(1,2-dichloro-1-cyclohexen-4-ylmethyl)phosphite,
1,2-dibromo-1-cyclohexen-4-yl-phosphate,
1,2-bromo-1-cyclohexen-4-ylmethylphosphate,
bis-(1,2-dibromo-1-cyclohexen-4-yl)phosphate,
bis-(1,2-dibromo-1-cyclohexen-4-ylmethyl)phosphate,
tris-(1,2-dibromo-1-cyclohexen-4-yl)phosphate,
tris-(1,2-dibromo-1-cyclohexen-4-ylmethyl)phosphate, 1,2-dibromo-1-cyclohexen-4-yl-phosphite,
1,2-dibromo-1-cyclohexen-4-ylmethylphosphite,
bis-(1,2-dibromo-1-cyclohexen-4-yl)phosphite,
bis-(1,2-dibromo-1-cyclohexen-4-ylmethyl)phosphite,
tris-(1,2-dibromo-1-cyclohexen-4-yl)phosphite,
tris-(1,2-dibromo-1-cyclohexen-4-ylmethyl)phosphite,
(1,2,3,4,7,7-hexachloro-2-norbornen-5-yl)phosphate,
(1,2,3,4,7,7-hexachloro-2-norbornen-5-yl)phosphite,
(1,2,3,4,7,7-hexachloro-2-norbornen-5-ylmethyl)phosphate,
(1,2,3,4,7,7-hexachloro-2-norbornen-5-ylmethyl)phosphite,
bis-(1,2,3,4,7,7-hexachloro-2-norbornen-5-yl)phosphate,
bis-(1,2,3,4,7,7-hexachloro-2-norbornen-5-yl)phosphite,
bis-(1,2,3,4,7,7-hexachloro-2-norbornen-5-ylmethyl)phosphate,
bis-(1,2,3,4,7,7-hexachloro-2-norbornen-5-ylmethyl)phosphite,
tris-(1,2,3,4,7,7-hexachloro-2-norbornen-5yl)phosphate,
tris-(1,2,3,4,7,7-hexachloro-2-norbornen-5-yl)phosphite,
tris-(1,2,3,4,7,7-hexachloro-2-norbornen-5-ylmethyl)phosphate,
tris-,1,2,3,4,7,7-hexachloro-2-norbornen-5-ylmethyl)phosphite, etc.

It is to be understood that the above set forth compounds are only representatives of the class of compounds which may be obtained according to the process of this invention and that said invention is not necesasrily limited thereto.

The following examples are given to illustrate the process of this invention which, however, are not intended to limit the generally broad scope of the present invention in strict accordance therewith.

*Example I*

In this example one molecular proportion of triallyl phosphate and three molecular proportions of hexachlorocyclopentadiene along with 25 g. of dry toluene are placed in the glass liner of a rotating autoclave. The liner is sealed into the autoclave and nitrogen pressed in until a pressure of about 30 atmospheres is reached. The autoclave and contents thereof are subsequently slowly heated to a temperature of about 105° C. and maintained thereat for a period of about 4 hours. At the end of this time the autoclave and contents thereof are allowed to cool to room temperature, the excess pressure is vented and the reaction product is recovered therefrom. The toluene is thereafter distilled off and the residue is further distilled in vacuum. From this distillation the desired reaction product comprising a mixture of (1,2,3,4,7,7-hexachloro-2-norbornen-5-ylmethyl)diallyl phosphate, bis-(1,2,3,4,7,7-hexachloro-2-norbornen-5-ylmethyl)allyl phosphate and tris - (1,2,3,4,7,7 - hexachloro - 2 - norbornen - 5 - yl-methyl)phosphate is separated and recovered.

*Example II*

A mixture of one molecular proportion of triallyl phosphate and three molecular proportions of 2,3-dichloro-1,3-butadiene along with 100 cc. of toluene is placed in the glass liner of a rotating autoclave. The glass liner is sealed into the autoclave and nitrogen pressed in until an initial pressure of about 30 atmospheres is reached. Following this the autoclave and contents thereof are slowly heated to a temperature of about 150° C. and maintained thereat for a period of about 4 hours. At the end of this time the autoclave and contents thereof are allowed to cool to room temperature, the excess pressure is vented and the reaction product is recovered. The product is subjected to distillation to remove the toluene and subjected to further fractional distillation at reduced pressure. The reaction product comprising a mixture of 1,2-dichloro-1,3-cyclohexen-4-ylmethyl diallylphosphate, bis-(1,2 - dichloro - 1 - cyclohexen - 4 - ylmethyl)allylphosphate and tris-(1,2-dichloro-1-cyclohexen-4-ylmethyl)-phosphate is recovered.

*Example III*

A mixture of one molecular proportion of tri-vinyl phosphite and three molecular proportions of 2,3-dichloro-1,3-butadiene along with a solvent comprising benzene is placed in the glass liner of a rotating autoclave and subjected to condensation under conditions similar to that set forth in the above examples. Following the completion of the residence time the reaction product is subjected to fractional distillation and the desired product comprising a mixture of (1,2-dichloro-1-cyclohexen-4-yl)divinylphosphite, bis-(1,2-dichloro-1-cyclohexen-4-yl)-vinylphosphite and tris-(1,2-dichloro-1-cyclohexen-4-yl)-phosphite is recovered.

*Example IV*

A mixture of one molecular proportion of trivinyl phosphite and three molecular proportions of hexachlorocyclopentadiene is subjected to condensation in the presence of a benzene solvent in a manner similar to that set forth in the above examples. Upon completion of the desired residence time and after distillation of the recovered product the desired reaction products comprising a mixture of (1,2,3,4,7,7-hexachloro-2-norbornen - 5 - yl)-divinylphosphite, bis-(1,2,3,4,7,7-hexachloro-2-norbornen-5-yl)vinylphosphite and tris-(1,2,3,4,7,7 - hexachloro-2-norbornen-5-yl)phosphite is separated and recovered.

*Example V*

A mixture of one molecular proportion of trivinyl phosphate and three molecular proportions of hexachlorocyclopentadiene is treated in a manner similar to that set forth in Example I above. After the various steps hereinbefore set forth the reaction product comprising a mixture of (1,2,3,4,7,7-hexachloro-2-norbornen-5-yl)-divinylphosphate, bis-(1,2,3,4,7,7-hexachloro-2-norbornen-5-yl)-vinylphosphate and tris-(1,2,3,4,7,7-hexachloro-2-norbornen-5-yl)phosphate is recovered.

*Example VI*

An insecticidal solution is prepared by dissolving 1 g. of tris-(1,2,3,4,7,7-hexachloro-2-norbornen-5-ylmethyl)-phosphate in two cc. of benzene after which the benzene solution is added to 100 cc. of water using 1 cc. of Triton X–100 as an emulsifying agent. This solution is sprayed into a cage containing common houseflies and will cause a 100% knock-down. Similiar tests of other insecticides of Examples II to V will show that these compounds, like the compound of Example I, will show an equal knockdown ability with essentially equal killing power.

I claim as my invention:

Tris-(1,2-dichloro-1-cyclohexen-4-yl)phosphite.

References Cited in the file of this patent
UNITED STATES PATENTS

| | | |
|---|---|---|
| 2,557,805 | Upson | June 19, 1951 |
| 2,767,206 | Whetstone et al. | Oct. 16, 1956 |
| 2,957,931 | Hamilton et al. | Oct. 25, 1960 |
| 3,080,417 | Rosen | Mar. 5, 1963 |

OTHER REFERENCES

Pudovik et al.: "Bull. Acad. Sci. U.S.S.R., Div. Chem. Sci.," 1952, pages 813–817.